A. P. CRAIG.
BAG HOLDER.
APPLICATION FILED MAY 19, 1916.
1,214,761. Patented Feb. 6, 1917.
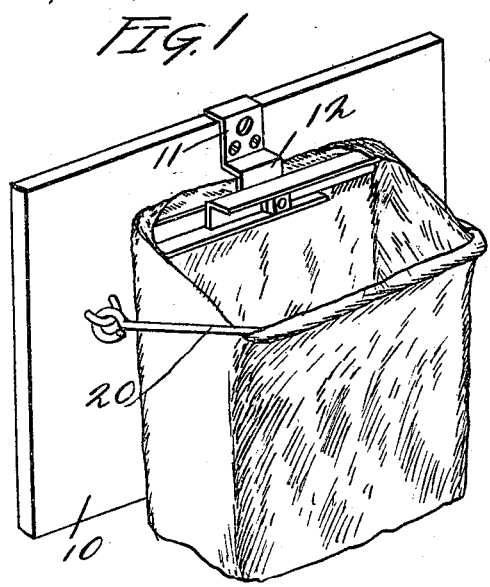
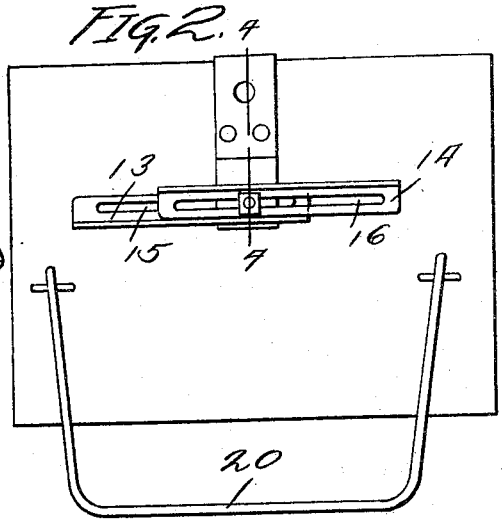
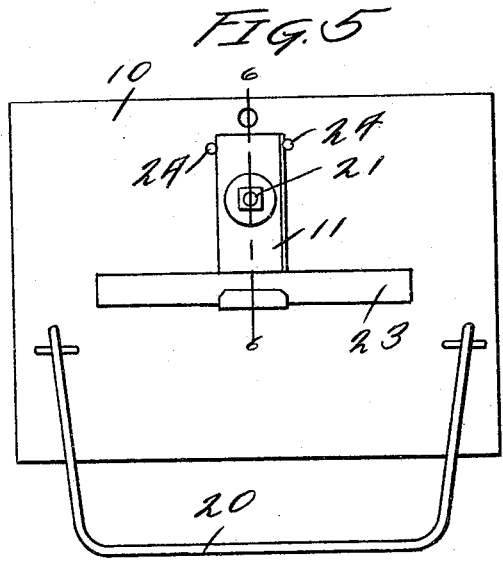
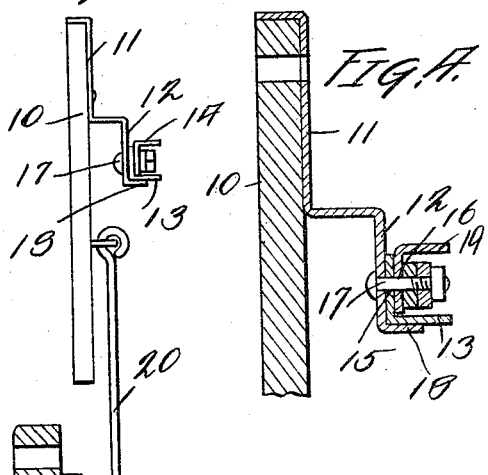
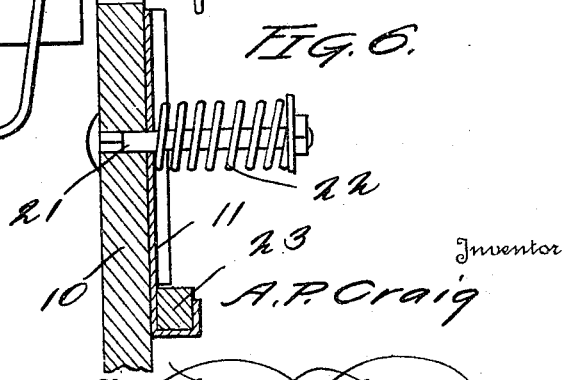
Inventor
A. P. Craig
By Chandler & Chandler
Attorneys
Witnesses

UNITED STATES PATENT OFFICE.

ALBERT P. CRAIG, OF DRAYTON, NORTH DAKOTA.

BAG-HOLDER.

1,214,761.　　　　　Specification of Letters Patent.　　Patented Feb. 6, 1917.

Application filed May 19, 1916. Serial No. 98,676.

*To all whom it may concern:*

Be it known that I, ALBERT P. CRAIG, a citizen of the United States, residing at Drayton, in the county of Pembina, State of North Dakota, have invented certain new and useful Improvements in Bag-Holders; and I do hereby declare the following to be a full, clear, and exact description of the invention, such as will enable others skilled in the art to which it appertains to make and use the same.

This invention relates to bag holders.

The object of the invention is to provide a bag holder embodying an improved construction which avoids the mouth of the bag being mutilated or injured, and which will be simple in construction, efficient in use, and which can be manufactured at a relatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a perspective view of the improved bag holder with a bag applied; Fig. 2, a front elevation of the bag holder with the bag removed; Fig. 3, a side view of what is shown in Fig. 2; Fig. 4, a section on the line 4—4 of Fig. 2; Fig. 5, a front elevation of a modified form of the invention, and Fig. 6, a section on the line 6—6 of Fig. 5.

Referring to Figs. 1 to 4 inclusive 10 indicates a suitable supporting part to which is secured a bracket 11 having an offset lower end 12 disposed in spaced relation to the supporting part. Disposed against the offset end 12 are oppositely arranged overlapping angle members 13 and 14. The overlapping portions of these members are provided respectively with elongated slots 15 and 16 portions of which register. Passed through the offset lower end 12 and the slots 15 and 16 is a securing bolt 17 whereby the members 13 and 14 are attached to the offset end 12. It will be noted that the free end of the portion 12 is turned outwardly as at 18 to form a support for the members 13 and 14 and to prevent said members from turning on the bolt 17 as a pivot. Pivoted to the support 10 beneath the members 13 and 14 is a bail 20.

In the use of the bag holder the mouth of the bag is passed to the rear of the offset portion 12 and then engaged over the members 13 and 14. The remainder of the mouth is then engaged around the bail 20 from the outside as clearly shown in Fig. 1, such a structure and application avoiding mutilation and injury to the bag. The bail is raised during the application of the bag and then released. The bail in its descent will draw the mouth of the bag taut.

In the modified form of the invention shown in Figs. 5 and 6 the bracket 11 is slidably engaged on a bolt 21 passed through the supporting part 10 and the bracket. A spring 22 encircles the bolt and normally holds the bracket against the supporting part. A cross member 23 is carried at the lower end of the bracket 10 and the latter is held against rotation on the bolt 21 by means of members 24 secured in the supporting part 10 on either side of the bracket. In other respects the construction shown in Figs. 5 and 6 is similar to that previously described. In applying a bag to the modified form it will be obvious that the member 23 can be lifted away from the part 10 to permit the mouth bag to be inserted behind same and in addition the spring 22 will allow the member 23 to move out to accommodate the device to bags having different size mouths.

What is claimed is:—

1. A bag holder comprising a supporting part, a bracket carried by the supporting part, a cross member carried by the bracket and spaced from the supporting part and under and over which the mouth of the bag is adapted to be engaged with the bag disposed between the cross member and the supporting part, and a bail pivoted to the supporting part a predetermined distance beneath the cross member and over the free portion of which the mouth of the bag is adapted to be engaged whereby the tendency of the free end of the bail to move downwardly under the influence of gravity will stretch the mouth of the bag fully open with the forward portion of the mouth disposed below the rear portions.

2. A bag holder comprising a supporting part, a bracket yieldingly held against the supporting part, and movable away from same, a cross member carried by the bracket over which the mouth of the bag is adapted to be engaged with the bag disposed between the cross member and the supporting part, and a bail pivoted to the supporting part and over the free end of which the mouth of the bag is adapted to be engaged whereby the tendency of the free end of the bail to move downwardly under the influence of gravity will stretch the mouth of the bag fully open.

In testimony whereof, I affix my signature, in the presence of two witnesses.

ALBERT P. CRAIG.

Witnesses:
I. STEENSON,
A. E. SOUTHARD.

Copies of this patent may be obtained for five cents each, by addressing the "Commissioner of Patents, Washington, D. C."